US008243789B2

(12) United States Patent
Demircin et al.

(10) Patent No.: US 8,243,789 B2
(45) Date of Patent: Aug. 14, 2012

(54) METHODS AND SYSTEMS FOR RATE-ADAPTIVE TRANSMISSION OF VIDEO

(75) Inventors: Mehmet Umut Demircin, Atlanta, GA (US); Petrus J. L. van Beek, Camas, WA (US); Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1603 days.

(21) Appl. No.: 11/627,348

(22) Filed: Jan. 25, 2007

(65) Prior Publication Data

US 2008/0181302 A1    Jul. 31, 2008

(51) Int. Cl.
    *H04N 7/12* (2006.01)
(52) U.S. Cl. .............................. 375/240.02; 375/240.06
(58) Field of Classification Search .................. 375/240, 375/240.02, 240.06
    See application file for complete search history.

(56) References Cited

U.S. PATENT DOCUMENTS

| 7,095,782 | B1 | 8/2006 | Cohen et al. |
| 7,227,894 | B2 * | 6/2007 | Lin et al. .................. 375/240.12 |
| 7,953,880 | B2 * | 5/2011 | Deshpande .................. 709/231 |
| 2003/0195977 | A1 | 10/2003 | Liu et al. |
| 2004/0179606 | A1 * | 9/2004 | Zhou et al. ............... 375/240.25 |
| 2005/0071876 | A1 * | 3/2005 | van Beek ........................ 725/62 |
| 2005/0275752 | A1 | 12/2005 | Li et al. |
| 2006/0083303 | A1 | 4/2006 | Han et al. |
| 2006/0114990 | A1 | 6/2006 | Pak |
| 2007/0153916 | A1 * | 7/2007 | Demircin et al. ......... 375/240.26 |

FOREIGN PATENT DOCUMENTS

| WO | WO2004036916 A1 | 4/2004 |
| WO | WO2007025560 A1 * | 8/2005 |
| WO | WO2006062330 A1 | 6/2006 |
| WO | WO2006080655 A1 | 8/2006 |

OTHER PUBLICATIONS

Thang et al., "SVC bitstream adaptation in MPEG-21 multimedia framework", Journal of Zhejiang University, May 23, 2006, Zhejiang University Press, co-published with Springer, vol. 7, issue 5, pp. 764-772.*
ISO/IEC JTC1/SC 29/WG11 (MPEG), "Study Text of ISO/IEC 14496-10:2006/PDAM 3 Scalable Video Coding", N8014, Montreux, Switzerland, Apr. 2006.
ISO/IEC JTC1/SC 29/WG11 (MPEG), "Joint Scalable Video Model (JSVM) 6", N8015, Montreux, Switzerland, Apr. 2006.
ISO/IEC JTC1/SC29/WG11 (MPEG), "Layered quality optimization for SVM", M11704, Hong-Kong, Jan. 2005.
P.A. Chou and Z. Miao, "Rate-distortion optimized streaming of packetized media," Tech. Report MSR-TR-2001-35, Microsoft Research, Feb. 2001.

(Continued)

Primary Examiner — Eleni Shiferaw
Assistant Examiner — Hilary Branske
(74) Attorney, Agent, or Firm — Michael Blaine Brooks, PC; Pejman Yedidsion; David Ripma

(57) ABSTRACT

Embodiments of the present invention comprise systems and methods for: authorizing the transmission of audiovisual data based on an iterative changing bit budget, where the bit budget may be based on a value of a total size of the set of Network Abstraction Layer units and a value of an initial size of the group of frames; and determining a bit budget remainder and an adjusted bit budget remainder.

11 Claims, 14 Drawing Sheets

OTHER PUBLICATIONS

J. Chakareski, J. Apostolopoulos, S. Wee, W. Tian and B. Girod, "Low-complexity rate-distortion optimized video streaming," Proc. IEEE Int. Conf. on Image Processing (ICIP 2004), Oct. 2004, Singapore.

J. Chakareski, J. Apostolopoulos, S. Wee, W. Tian and B. Girod, "R-D hint tracks for low-complexity rate-distortion optimized video streaming," Proc. IEEE Int. Conf. on Multimedia and Expo(ICME 2004), Jun. 2004, Taipei, Taiwan.

M. Van Der Schaar, Y. Andreopoulos, Z. Hu, "Optimized scalable video streaming over IEEE 802.11 a/e HCCA wireless networks under delay constraints," Mobile Computing, IEEE Transactions on , vol. 5, No. 6pp. 755-768, Jun. 2006.

T. Kim, M. H. Ammar, "Optimal quality adaptation for scalable encoded video," Selected Areas in Communications, IEEE Journal on , vol. 23, No. 2pp. 344-356, Feb. 2005.

Z. Miao and A. Ortega, "Optimal scheduling for streaming of scalable media," in Asilomar Conf. Signals, Systems, and Computers, 2000.

Z. Miao and A. Ortega, "Expected run-time distortion based scheduling for delivery of scalable media," in Packet Video Workshop, 2002.

ISO/IEC 14496-10:2005 (E), "Advanced video coding for generic audiovisual services," ITU-T Rec. H.264, Mar. 2005.

J. Reichel, H. Schwarz, M. Wien, "Working Draft 1.0 of 14496-10:200x/AMD1 Scalable Video Coding," JVT of ISO/IEC JTC 1/SC 29/WG 11, N6901,Hong Kong, China, Jan. 2005.

* cited by examiner

METHODS AND SYSTEMS FOR RATE-ADAPTIVE TRANSMISSION OF VIDEO

FIELD OF THE INVENTION

Embodiments of the present invention comprise methods and systems for rate-adaptive transmission of video.

BACKGROUND

Transmission of video signals requires the transfer of large amounts of information at high bit-rates under a time-sensitive schedule. This task becomes even more challenging when a video signal competes with other traffic on a busy network and/or a network's reliability is diminished. When a transmission medium will not accommodate a complete video signal, some parts of the signal may need to be omitted from the transmission. When less important parts of the signal are omitted, video quality will be higher than when random parts are lost during transmission.

SUMMARY

Embodiments of the present invention comprise methods and systems for rate-adaptive transmission of video.

DETAILED DESCRIPTION OF EXEMPLARY EMBODIMENTS

Figure 1:
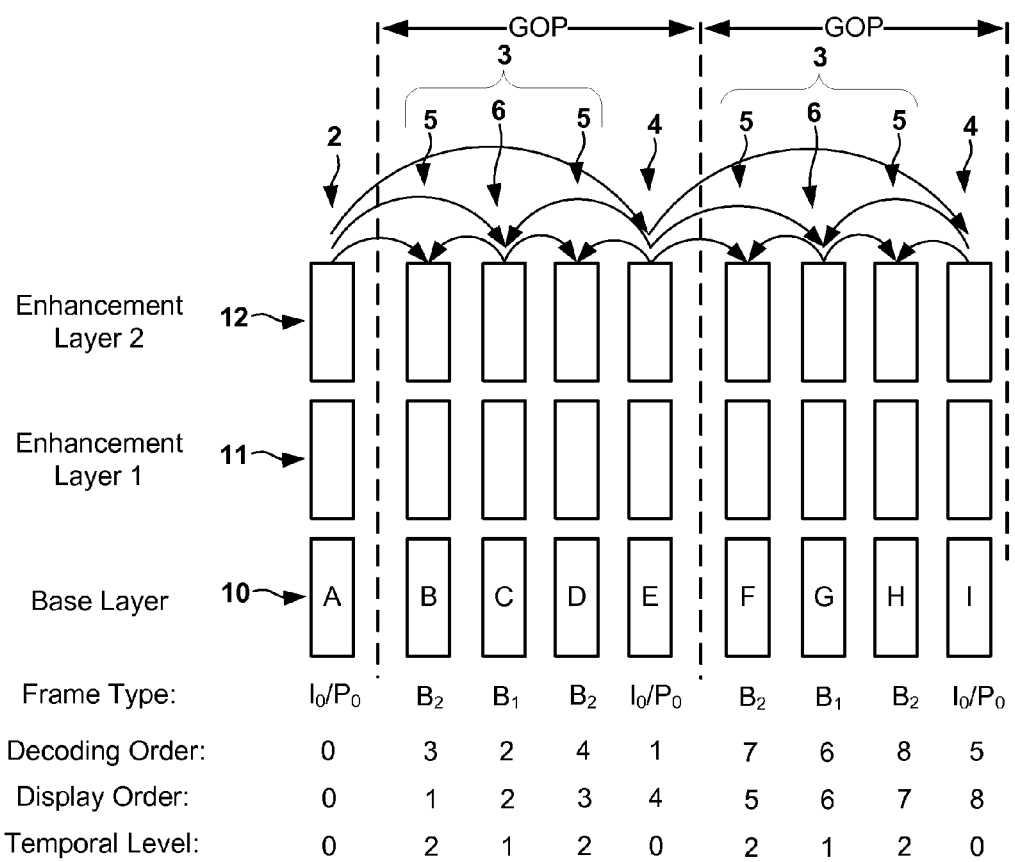
FIG. 1 is a diagram showing an exemplary bit stream structure.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

H.264/MPEG-4 AVC [Joint Video Team of ITU-T VCEG and ISO/IEC MPEG, "Advanced Video Coding (AVC)-$4^{th}$ Edition," ITU-T Rec. H.264 and ISO/IEC 14496-10 (MPEG4-Part 10), January 2005], which is incorporated by reference herein, is a video codec specification that is related to some embodiments of the present invention.

ISO/IEC JTC1/SC 29/WG11 (MPEG), "Joint Scalable Video Model (JSVM) 6", N8015, Montreux, Switzerland, April 2006, which is incorporated by reference herein, is a video codec specification that is related to some embodiments of the present invention.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between layers is exploited by inter-layer prediction mechanisms.

Some embodiments of the present invention relate to high-quality and robust transmission of audiovisual (AV) data from a source device (e.g., server) to one or more destination devices (e.g., clients) over a packet network. One example is streaming video from a media server to TV sets in the home over wireless links (for example, 802.11). Another example is streaming video from a content delivery service to a client in the home over a broadband access network. Such consumer applications require transmission of audio and video at high bit rates, and require a low end-to-end delay (low latency). Transmission of both stored and live video may be required.

A network linking a video transmitter to a receiver can often be considered a transmission channel with time-varying channel conditions. For example, the available bandwidth of a wireless link based on 802.11 may vary over time and can be unpredictable due to the unknown distance from the sender to the receiver device, due to RF interference, due to fading, due to collisions with other traffic, and due to other influences. Network congestion can also contribute to time-varying and unreliable behavior. Transmission of compressed AV data over such networks is challenging because high-quality AV data streams require a very high bandwidth continuously, and impose stringent delay constraints on delivery of AV data. Furthermore, a small number of lost or late packets may have a large effect on video quality seen at the receiver, due to the dependencies between parts of the compressed AV stream. Adaptation of the video stream to the channel condition may be used to mitigate this problem.

In the case where the video stream consists of a single-layer, non-scalable bit stream, one approach to bit rate adaptation is through the use of transcoding or transrating. A major drawback of transcoding or transrating a single-layer bit stream is the associated computational complexity. Transcoding involves parsing of the video bit stream, and usually also involves partially decoding the bit stream, followed by re-encoding. Therefore, the amount of computational resources needed for transcoding is significant, which limits its application to platforms with the required resources available, and may further limit the number of streams that can be processed. Another disadvantage is that there is usually a delay in the response of a transcoder to a request by a control algorithm, for example in response to a detected change in channel conditions.

Scalable Video Coding (SVC) is an extension of the H.264/MPEG AVC video codec. H.264/MPEG AVC and SVC are international video coding standards jointly developed by ITU and ISO. SVC enables coding video in a scalable manner, resulting in a scalable bit stream, for example by coding the video data in several layers. SVC enables fine-grained adaptation of a bit stream in spatial, temporal and SNR dimensions simply by discarding parts of the bit stream. Adapted bit streams, for example with lower bit rates, can be extracted from the original scalable bit stream by a process requiring few computational resources. This process is also much faster than transcoding a non-scalable bit stream, thus avoiding in large part the above-mentioned response delay.

Embodiments of the present invention may dynamically adapt a given SVC bit stream for high-quality video streaming, by intelligently selecting which parts of the bit stream should be transmitted, which parts should be discarded entirely, and which parts should be transmitted partially (truncated), in order to meet time-varying rate and/or delay constraints. These embodiments relate to adapting the bit rate to varying channel conditions, and allocation of a transmission bit budget to various components of a scalable coded video bit stream.

Embodiments of the present invention provide methods and systems for adapting the instantaneous bit rate of a video bitstream encoded in Scalable Video Coding (SVC) format to unpredictable and changing channel conditions.

In some embodiments, a group of frames comprising a current frame and several subsequent frames is considered, a bit budget for that group of frames is calculated, and then bits are allocated to the Network Abstraction Layer (NAL) units of the current frame according to several methods. This may result in discarding enhancement layer NAL units and/or truncation (partial transmission) of enhancement layer NAL units. The use of a moving window comprising a group of multiple frames reduces video quality variations over time due to the variations in the bit sizes of individual frames.

In some embodiments, the system may apply rate scaling to the current frame, where a common bit-rate scaling factor may be used for every frame in the group. The system then transmits the base layer NAL units of the current frame, and transmits enhancement layer NAL units of the current frame up to the computed bit budget for the current frame.

In some embodiments, the system transmits the base layer NAL unit of the current frame, and transmits enhancement layer NAL units of the current frame provided that the enhancement NAL units of other frames at the same layer fit into the bit budget for the group. To transmit the enhancement layer NAL unit of the next higher layer, the remaining bit budget is scaled using a common scaling factor for all NAL units in the group at the same layer.

In some embodiments, the system may consider quality layer ID information that may be available from the bit stream. This may be information on the importance of each NAL unit in terms of decoded video quality. NAL units with the same quality layer ID value may be grouped together into subsets. The system may then allocate bits from the bit budget to such subsets in order of their importance (in terms of quality layer ID).

In some embodiments, when the bit budget is very small, all enhancement layer NAL units, as well as the base layer NAL unit, may be discarded. In these embodiments, a second group of frames comprising the current frame and several subsequent frames may be considered and a new bit budget for that group of frames may be computed. In this case, base layer NAL units are first grouped into subsets based on their temporal level. Subsequently, these embodiments decide to transmit or discard the base layer NAL unit of the current frame. Consideration of the number of frames in this group results in higher video quality.

In other embodiments, when the system detects that there may be additional channel bandwidth available, transmission of NAL units that were previously discarded or transmitted only partially may be considered and performed. Eligible NAL units may be reconsidered for transmission in delayed manner. This method results in high video quality because it increases channel bandwidth utilization.

Scalable Video Coding (SVC) is an extension of the H.264/MPEG AVC video codec. H.264/MPEG AVC and SVC are international video coding standards jointly developed by ITU and ISO. SVC supports scalability in the spatial, temporal, and SNR (signal-to-noise ratio) dimensions. SVC supports coarse-grained SNR scalability (CGS) by coding the video data as a layered structure. SVC supports medium grain scalability (MGS) by coding the video data with quality identifiers within enhancement layers. A base layer provides a minimum level of video quality, and may provide compatibility with H.264/AVC. One or more enhancement layers provide additional quality in an incremental manner, also referred to as progressive refinement. Decoding of the first enhancement layer requires availability of the base layer. Decoding of each subsequent enhancement layer requires availability of all previous enhancement layers, as well as the base layer. SVC also supports fine-grained SNR scalability (FGS), which enables truncation of an enhancement layer at any point in the bit stream. Fine-grained SNR scalability is achieved by encoding successive refinements of the transform coefficients. Furthermore, temporal scalability is supported based on a flexible temporal prediction structure, for example using hierarchical B-frames. Temporal scalability utilizes the concept of a temporal level, which indicates the level of a video frame in a hierarchical temporal prediction structure.

FIG. 1 illustrates an exemplary prediction structure, GOP structure and layering structure of a sample SVC bit stream. Temporal scalability is achieved using an IBP prediction structure with hierarchical B-frames. This structure uses I-frames 2, which are intra-predicted from within the frame; B-frames 3, which may be predicted from one or more other frames; and P-frames 4 which are predicted from another I-frame. A hierarchical B-frame 5 may be predicted from other B-frames as well as I-frames and P-frames while a standard B-frame 6 may only be predicted from I-frames and P-frames. In this example, the GOP size is equal to four frames. The first frame of the GOP (in encoding/decoding order) is a key picture 2, 4. The key pictures are either intra-coded (I-frame) 2 or inter-coded using a previous (key) picture (P-frame) 4 as a reference for motion-compensated prediction. Key pictures may be considered a base layer for temporal scalability and may be assigned temporal level 0. The remaining pictures of a GOP are hierarchically predicted as illustrated by arrows in FIG. 1. These non-key pictures form successive temporal levels for temporal scalability, each layer incrementing the temporal level by 1. In some embodiments, the temporal level may be a function of the number of frames through which a current frame is predicted. For example, frame A is intra-predicted and is not predicted from any other frame, accordingly, its temporal level is 0. As another example, frame C is predicted only from key frames, which have a temporal level of 0. Accordingly, frame C has a temporal level of 1 indicating that it has been predicted through one key frame. As yet another example, frame B is predicted from frame C, which was predicted from frame A. Since frame B has been predicted through two other frames successively, it is assigned a temporal level of 2.

Coarse-grained SNR scalability is achieved using a layered structure for each frame, with a base layer 10 and two enhancement/refinement layers 11, 12 in this example. More or fewer enhancement layers may be used in some embodiments. Each enhancement layer may also include fine-grained SNR scalability.

The SVC bitstream comprises NAL (Network Abstraction Layer) units similar to H.264/AVC. The base layer data of a video frame may be encapsulated into a NAL unit, and the data for each enhancement layer of a video frame may be encapsulated into a NAL unit.

Figure 2:
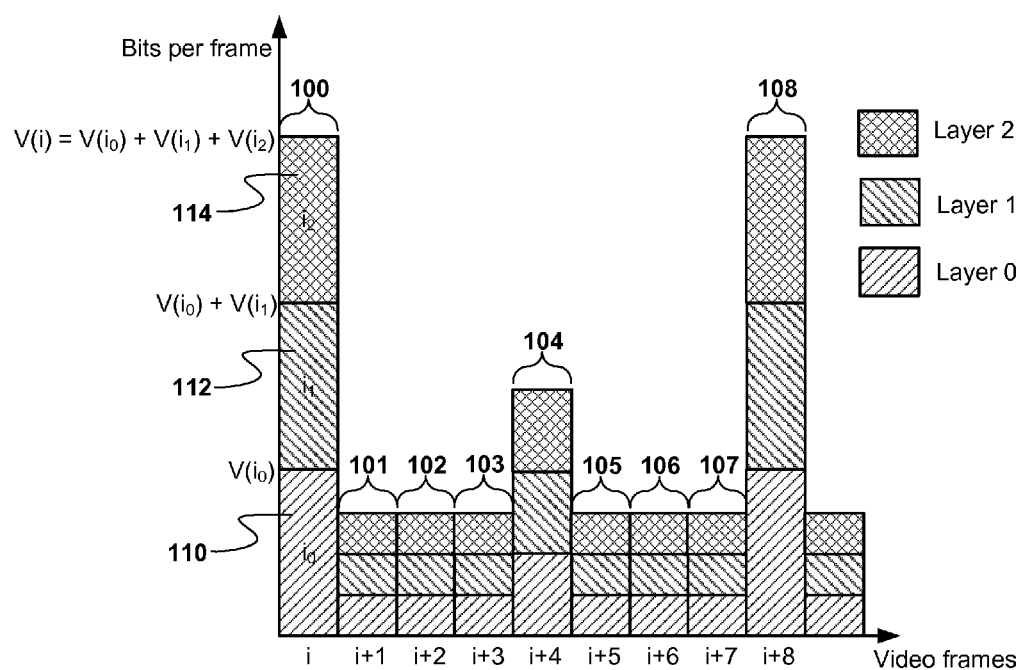
FIG. 2 is a diagram showing an exemplary bit stream structure comprising the size of layer units.

Aspects of an exemplary SVC format may be explained with reference to FIG. 2. In this figure, the horizontal axis represents video frames in display order and the vertical axis represents the number of bits per video frame. This figure corresponds loosely to FIG. 1, wherein the first frame, frame i 100 and last frame, frame i+8 108, are intra-coded I-frames and, therefore comprises a much larger quantity of bits per frame than subsequent B-frames 101-103, 105-107 and even a P-frame 104, which is predicted only from other key frames. In this figure, each frame is divided into a base layer, layer 0, shown at the bottom of the graph and two enhancement layers, layer 1 and layer 2, shown above the base layer. For example, frame i 100 comprises base layer 110, a first enhancement layer 112 and a second enhancement layer 114.

Figure 3:
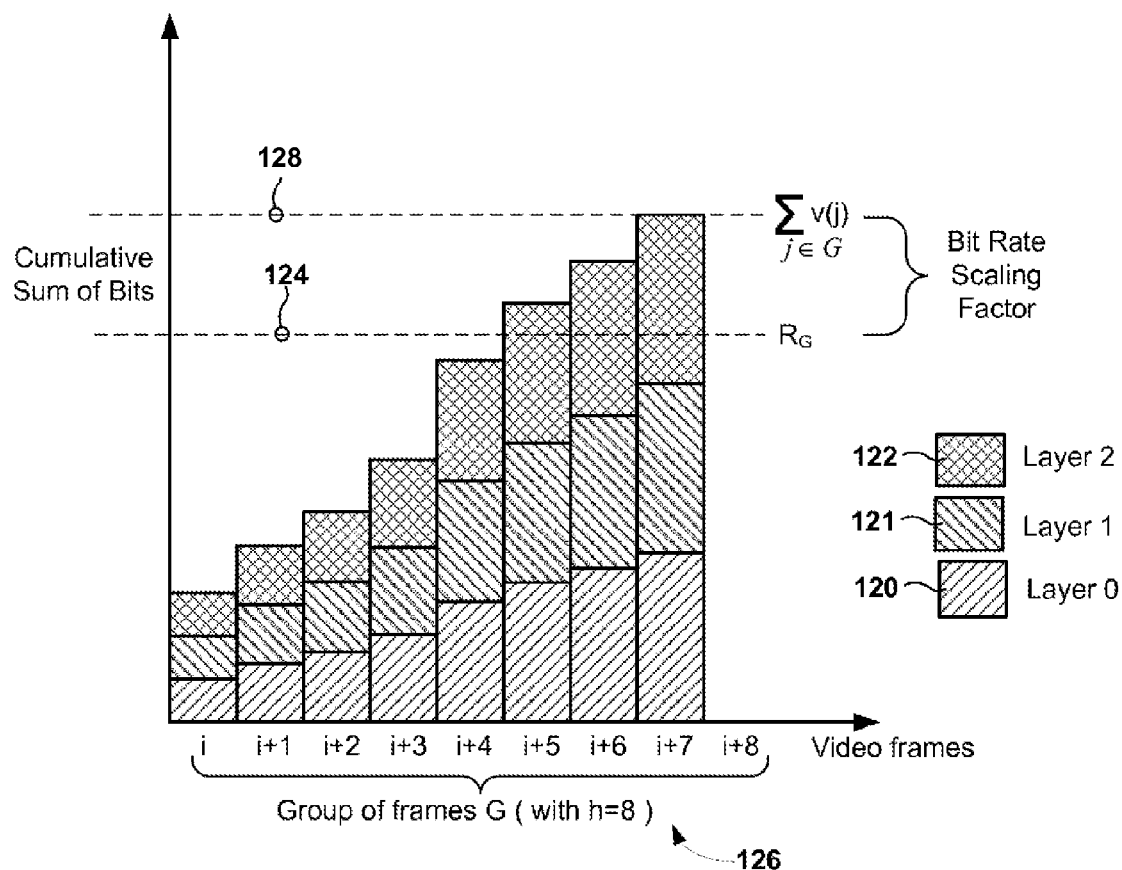
FIG. 3 is a diagram showing an exemplary bit stream structure comprising a cumulative sum of bits.

FIG. 3 illustrates some aspects of some embodiments of the present invention. FIG. 3 shows a cumulative total size of a group of frames. The horizontal axis represents video frames in display order and the vertical axis represents a cumulative sum of bits. The base layer 120 is shown at the bottom of each frame, a first enhancement layer 121 is shown above the base layer and a second enhancement layer 122 is shown above the first enhancement layer 121. The cumulative sum of bits for the entire group of frames 126 is shown as line 128. In some embodiments of the present invention, a bit budget 124 may be calculated. The bit budget may be based on available communication bandwidth and/or other factors. When the bit budget 124 is less than the cumulative total sum of bits 128 for the group of frames 126, all or part of a current or target frame may be truncated or discarded according to various methods described elsewhere in this specification.

Figure 4:
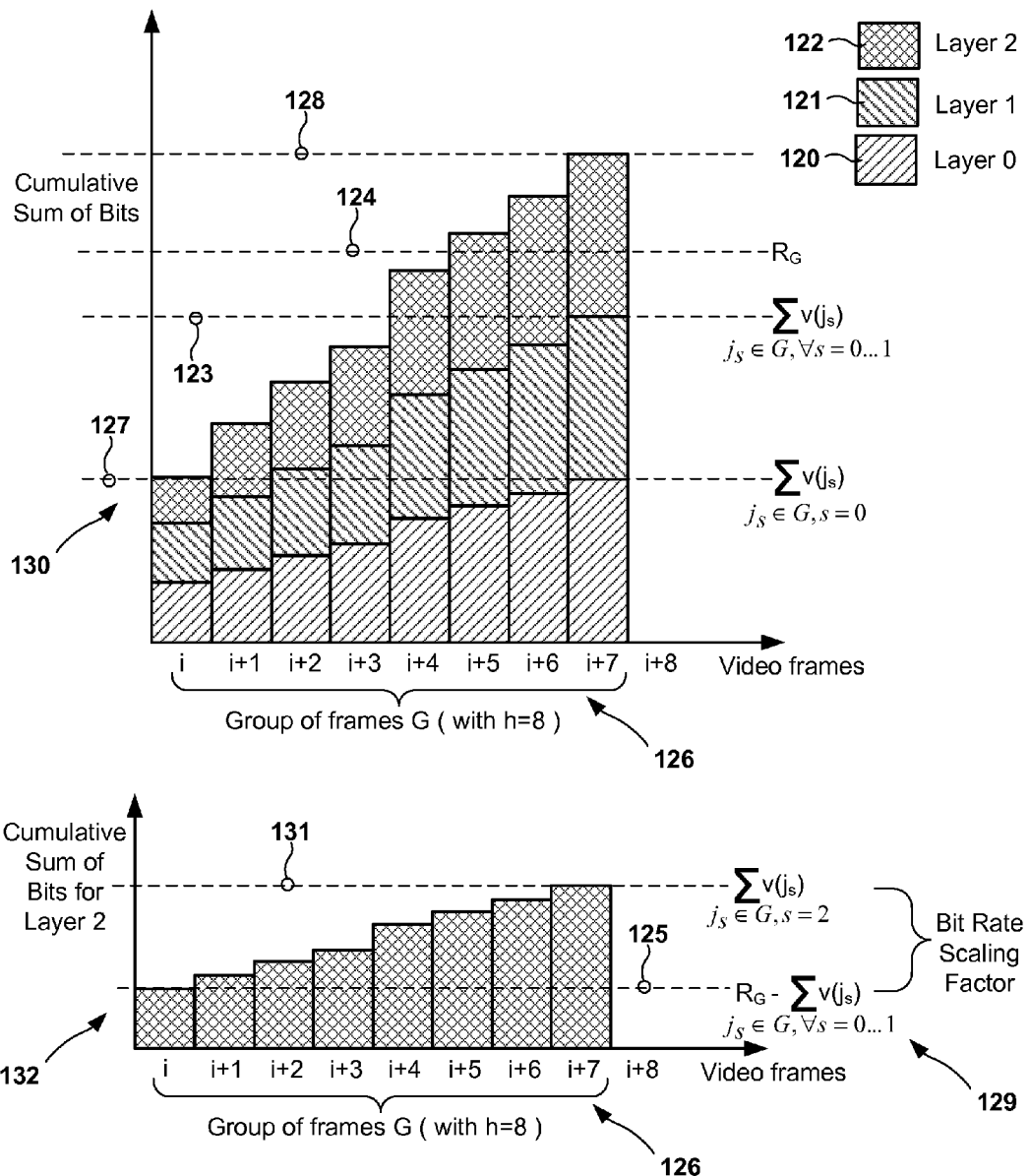
FIG. 4 is a diagram showing an exemplary bit stream structure with cumulative layer sizes and a bit budget.

FIG. 4 also depicts a cumulative total size of a group of frames, with axes and layers 120-122 as described for FIG. 3. FIG. 4 shows two graphs, an upper graph 130 which depicts all layers 120-122 of each frame, and a lower graph 132, which depicts only the highest enhancement layer 122. In an exemplary embodiment described in relation to FIG. 4, a bit budget 124 is established. In this example, the bit budget 124 falls below the cumulative total for all layers 128, but is above the cumulative total size of the base layer 127 and the first enhancement layer 123. Because the cumulative total of the base layer 127 and the first enhancement layer 123 fall within the bit budget 124, it may be determined that the complete NAL units for those layers, in the current frame, may be transmitted.

However, because the total for all layers 128 is outside the limits of the bit budget 124, some or all of the NAL units in the second enhancement layer 122 may be truncated or omitted from current transmission in order to meet the bit budget 124. In some embodiments, the enhancement layer 122, which the bit budget intersects may be examined individually as depicted in lower graph 132 and a bit rate scaling factor 129 may be determined. In some embodiments, the bit rate scaling factor 129 may be determined as the ratio of the remaining bit budget 125 to the total size or cumulative sum of bits for the intersected layer 131. This bit rate scaling factor 129 may be used to truncate intersected layer NAL units or omit intersected layer NAL units from a current transmission.

Figure 5:
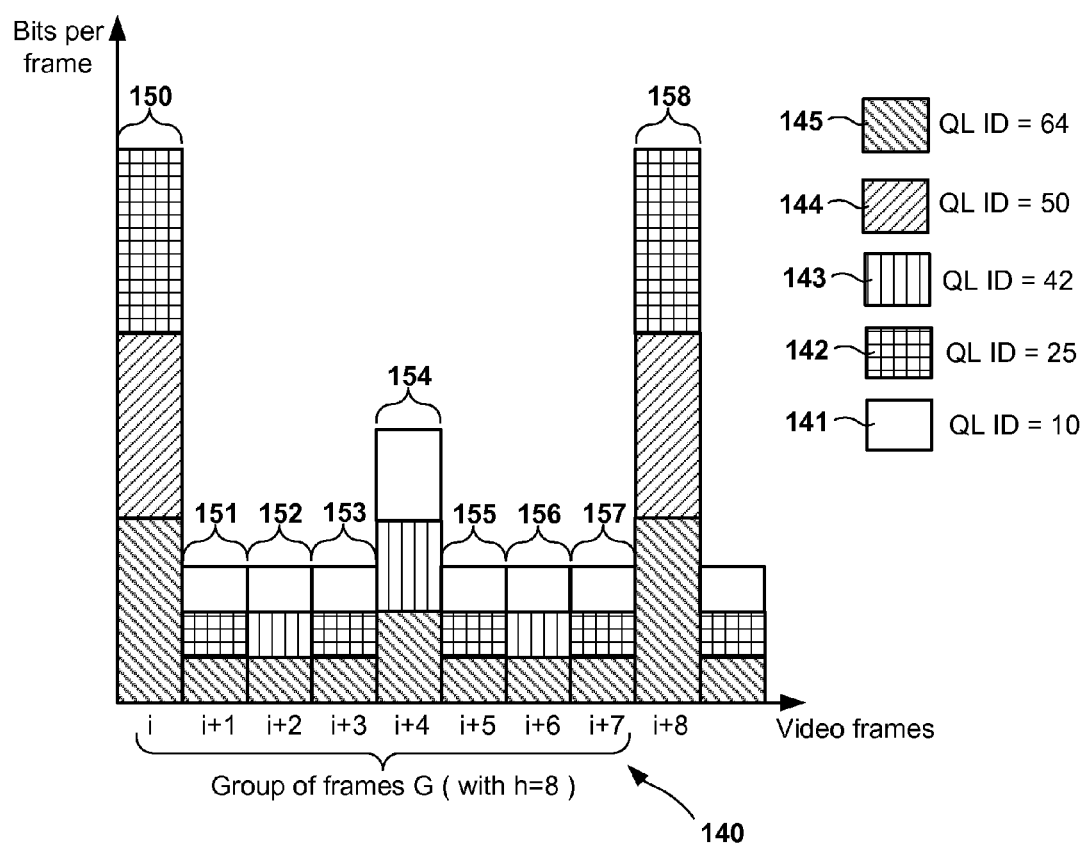
FIG. 5 is a diagram showing an exemplary bit stream structure with an exemplary assignment of quality layer identification values.

Some embodiments of the present invention may comprise quality layer information. Some of these embodiments may be described in relation to FIG. 5. In these embodiments, NAL units of each frame may be assigned a quality layer identification (QLID) value. The QLID may be based on the layer of the NAL unit, the prediction type of the frame, the distortion of the signal if the unit were omitted or some other factor related to the quality of the signal as it is affected by a particular NAL unit. Several QLID values 141-145 may be assigned to the NAL units in a group of frames 140. In some embodiments, all base layer NAL units may be assigned the same value. In some embodiments, enhancement layer NAL units may be assigned a QLID based on their relative enhancement layer and frame prediction scenario. For example, a first frame 150 of a group of frames 140 may be an I-frame from which other frames are predicted. In this case, the I-frame's 150, 158 layers may have higher priority (e.g., 64, 50 & 25) than the respective layers of a P-frame 154 (e.g., 64, 42 & 10) or those of B-frames 152, 156 (e.g., 64, 42 & 10). Hierarchical B-frames 151, 153, 155 & 157 may have even lower QLID values (e.g., 64, 25 & 10) when they are predicted from other B-frames 152, 156. Some embodiments of the present invention may utilize NAL unit QLID values to prioritize bandwidth allocation. NAL units with QLID values below a threshold value may be truncated or omitted from a transmission.

Embodiments of the present invention may utilize quality layer (QL) identifiers to provide additional information for optimized adaptation of a scalable bit stream containing progressive refinement NAL units. In these embodiments, a quality layer identifier is assigned to each NAL unit. The value of the quality layer identifier may be in the range from 0 to QLmax, inclusive. The value of a QL identifier corresponds to the relative importance of a NAL unit in terms of the impact on the overall video distortion, if the NAL unit is not available for decoding. The QL identifier may also be related to the size (in bits or bytes) of the NAL unit. In some embodiments, QL identifiers can be computed by determining and ranking the rate-distortion slope (ratio of distortion and size) of the NAL units over the entire bitstream. In some embodiments, the value of a QL identifier gets higher as the relative importance of the NAL unit increases.

Quality Layer identifiers may be included in the bit stream, as enabled by the SVC standard. In some embodiments, QL identifier values can be obtained directly from the bit stream, prior to its adaptation. In other embodiments, QL identifier values may be inferred, or may be processed further, prior to adaptation of the bit stream.

In some embodiments of the present invention, all SNR base layer NAL units may have an associated QL identifier with the same value, equal to $QL_{max}$. Equivalently, in some embodiments, the base layer NAL units for different frames may all be considered to have the same importance. Also, base layer NAL units may always be considered at least as important or more important than any enhancement layer NAL unit. Note that the value of the QL identifier of a base layer NAL unit may not be available directly from the bit stream; however, it can simply be assigned to the maximum value $QL_{max}$ for the purposes of these embodiments.

The following variables, terms and expressions may be used to describe elements and concepts within embodiments of the present invention.

L: Number of SNR layers (including the base layer)

$i_k$: NAL unit index, $k^{th}$ SNR layer of frame i (in decoding order), k=0, 1, . . . , L−1. Denotes SNR base layer if k=0; denotes SNR enhancement layer if k>0.

$v(i_k)$: Initial size of the NAL unit $i_k$ (in bits), before bit rate adaptation.

$$v(i) = \sum_k v(i_k):$$

Initial size of frame i (in bits), before bit rate adaptation.

V: Initial video bit rate (bits per second)

$\tau(i)$: Temporal level of frame i.

$QL(i_k)$: Quality layer identifier of NAL unit $i_k$.

In this invention, the QL identifier for each base layer NAL unit takes the value $QL_{max}$ and the QL identifier of any enhancement layer NAL unit takes a value smaller than $QL_{max}$.

For example, for NAL units $i_k$, k=1, . . . , L−1, the quality layer identifier as defined by the SVC draft of "Joint Scalable Video Model" may be used. This SVC draft assigns quality layer identifier values between 0 and 63 (inclusive) to enhancement layer NAL units $i_k$, k=1, . . . , L−1. For NAL units $i_0$, $QL(i_0)$ can take a value larger than 63, or any value larger than the maximum value allowed for enhancement layer NAL units by the SVC draft standard.

$r(i_k)$: Transmission size (in bits) of the NAL unit $i_k$ after rate adaptation.

$$r(i) = \sum_k r(i_k):$$

Transmission size (in bits) of frame i after rate adaptation.

$\Delta T_E$: Initial playout buffering duration (delay tolerance). Fixed for every frame and does not include the decoder buffering delay.

$\Delta T$: Inter-frame interval.

Rate-Adaptive SVC Streaming

In some embodiments, the SVC stream bit rate may be adjusted in real-time utilizing SNR and temporal scalability features. SNR enhancement layers for each frame may be dropped (not transmitted) or may be truncated (partially transmitted) in order to reduce the bit rate. Furthermore, the temporal resolution of the video may be reduced up to a minimum level where only key frames are transmitted, by dropping certain non-key frames. The rate adaptation methods of these embodiments may be based on estimates of the channel bandwidth, $\hat{H}$, and channel backlog, $\hat{B}$. The channel bandwidth represents the maximum throughput and can be expressed in bits or bytes per second. The channel backlog represents the amount of data, expressed in bits or bytes, that is buffered somewhere in the channel, e.g., sent into the channel by the server, but not yet received by the client. For example, when streaming over a wireless LAN link, packets that are sent at the application or transport layer may still be held in a transmission buffer/queue at the sender MAC/PHY. The system may consider this data as yet to be transmitted.

Existing techniques for estimating channel bandwidth and channel backlog may be used in some embodiments. Some techniques to estimate these parameters are disclosed in previously-filed patent applications: Patent Publication No. US2005-0071876A1, entitled "Wireless Video Transmission System," filed on Sep. 30, 2003, invented by Petrus J. L. van Beek; and U.S Pat. No. 7,953,880, entitled "Content-Aware Adaptive Packet Transmission," filed on Nov. 16, 2006, invented by Sachin Deshpande, which are hereby incorporated herein by reference. For example, the client may send a feedback message, used to estimate bandwidth and backlog, after receiving a burst of packets. A burst is defined as a set of video packets that are sent at nearly the same time from the server application.

Real-time rate-adaptation may be performed considering the delay constraints of the video frames. Some embodiments may deliver frames to the client prior to their decoding deadline, while minimizing the distortion due to rate adaptation. These embodiments may utilize bit rate adjustment techniques based on multi-frame delay-constraints. Some embodiments may comprise methods and systems described in U.S. Patent Publication No. US 2007-0153916A1, entitled "Wireless Video Transmission System," filed on Jun. 30, 2006, invented by Mehmet U. Demircin and Petrus J. L. van Beek, which is incorporated herein by reference. In these embodiments, the current frame as well as multiple future frames in the transmission order may be considered jointly for changing the streaming rate, using a pre-selected time scale. The first stage of these embodiments involves the computation of a delay-constrained transmission bit-budget for these multiple frames. At the second stage, a transmission bit rate decision for the current frame is made. When available, Quality layer (QL) information can be utilized for improved rate allocation.

SVC Rate Adaptation Based on SNR Scalability

In some embodiments, the delay-constrained bit-budget of the current (i) and h−1 future frames in the transmission order may be computed. These h frames are called a group and denoted as G={i,i+1, . . . , i+h−1}. The bit-budget for this group can be expressed as:

$$R_G = \hat{H} \cdot [(h-1)\Delta T + F \cdot \Delta T_E] - \hat{B} \quad (1)$$

In this expression $R_G$ is the group bit-budget, and F is a parameter that determines the target size of the channel backlog at the end of transmitting the group of frames. This parameter, F, may also determine the target fullness of the playout buffer at the client. Optimal values of h and F parameters, which result in optimal quality, depend on delay tolerance, channel conditions, and video source characteristics. For example, in a low delay scenario, the number of frames in a group (h) may be kept relatively low. These parameters may be extracted from look-up tables or automatically determined during the streaming session. The number of frames in a group may be static (fixed) throughout a streaming session. Alternatively, the number of frames in a group may be varied dynamically, depending on channel and system conditions.

If the group bit budget is equal to or larger than the total size of all frames in the group, e.g., if $$R_G \geq \sum_{j \in G} v(j),$$

all SNR layers of the current frame will be transmitted. Therefore, the rate of the current frame is not reduced, e.g.:

$r(i_k)=v(i_k)$ for all k<L.

If the group bit budget is smaller than or equal to the total size of the SNR base layers of the frames in the group, i.e. if $$R_G \leq \sum_{j \in G} v(j_0),$$

the system will transmit only the base layer NAL unit of the current frame and discard all enhancement layer NAL units. Therefore:

$r(i_0)=v(i_0)$ and $r(i_k)=0$ for all 0<k<L.

If the group bit-budget is less than the total size of the frames in the group, but more than the total size of the SNR base layer data only, i.e. if $$\sum_{j \in G} v(j_0) < R_G < \sum_{j \in G} v(j),$$

the system may transmit the base layer NAL unit of the current frame, and may transmit part of the enhancement layer data, and discard the remaining part. The bit rate of the stream should be reduced in the projected time scale that corresponds to the h frames in the group. In some embodiments, the transmission size of the current frame, r(i), may be determined as follows. In some embodiments, each video frame in the group G may be treated the same, without using quality layer (QL) information. In some embodiments, different layers may be treated differently, prioritizing lower layers more than higher layers. In some embodiments, the quality layer (QL) information may be utilized, thereby distinguishing different video frames in terms of their effect on the overall video quality.

SNR Layer Dropping and Truncation Method 1: Rate Scaling

These embodiments may reduce the size of every frame in the group to the same rate. The transmission size of the current frame, r(i), may be computed by scaling its initial bit size by the ratio of the bit budget for the group and the initial bit size of the group, as follows:

$$r(i) = v(i) \frac{R_G}{\sum_{j \in G} v(j)}. \quad (2)$$

The transmission budget for the current frame, r(i), may be distributed among the NAL units (corresponding to different SNR layers) as follows. Note that the base layer NAL unit is transmitted entirely.

The system first does a check to see if all the layers of the current frame can be transmitted:

If $$r(i) \geq \sum_{k=0}^{L-1} v(i_k) \text{ then } r(i_k) = v(i_k) \text{ for all } 0 \leq k < L.$$

Otherwise, the system determines the largest layer index M such that all SNR layers for this frame with a layer number smaller than M, fit into the bit budget for the frame entirely.

$$M = \max\left\{ j \middle| 0 < j < L \text{ and } \sum_{k=0}^{j-1} v(i_k) < r(i) \right\} \quad (3)$$

Subsequently, NAL units for this frame with SNR layer index smaller than M, are transmitted entirely:

$r(i_k)=v(i_k)$ for all $0 \leq k < M < L$.

Furthermore, the NAL unit for this frame with SNR layer index M is truncated as follows:

$$r(i_k) = r(i) - \sum_{k=0}^{M-1} v(i_k), \text{ for } k = M < L.$$

Note that truncation of this NAL unit is only allowed if the layer is coded in fine-grained scalable (FGS) manner. Otherwise, this NAL unit is discarded entirely.

If any NAL units exist for this frame with SNR layer index larger than M, they are discarded entirely:

$r(i_k)=0$, for M<k<L.

SNR Layer Dropping and Truncation Method 2: Layer Prioritization

These embodiments treat different layers differently, prioritizing lower layers more than higher layers. The transmission rate allocation for each enhancement layer NAL unit $i_k$ (0<k<L) of the current frame i is determined as follows. This method proceeds layer by layer, starting from the enhancement layer with the lowest k.

The current NAL unit $i_k$ is transmitted entirely if the bit-budget is large enough for this NAL unit as well as all the NAL units in the group belonging to the enhancement layer k and all the lower enhancement layers:

$$r(i_k) = v(i_k), \text{ if: } R_G \geq \sum_{j_s \in G, \forall s = 0 \ldots k} v(j_s).$$

If the NAL unit is transmitted entirely, the next NAL unit with layer index incremented by 1 will be considered.

Otherwise, if $$\sum_{j_s \in G, \forall s = 0 \ldots k} v(j_s) > R_G \geq \sum_{j_s \in G, \forall s = 0 \ldots k-1} v(j_s)$$

the transmission size of the current NAL unit $i_k$ is computed as follows:

$$r(i_k) = v(i_k) \frac{\left(R_G - \sum_{j_s \in G, \forall s=0\ldots k-1} v(j_s)\right)}{\sum_{j \in G, s=k} v(j_s)}.$$

Furthermore, in this case the NAL units $i_{k+1}, \ldots, i_{L-1}$ are discarded entirely:

$$r(i_{k+1})=0, \ldots, r(i_{L-1})=0.$$

SNR Layer Dropping and Truncation Method 3: Quality Layer Information Based

These embodiments may use quality layer (QL) information for determining the transmission decisions for the current frame. These embodiments reduce distortion, i.e., maximize quality, by transmitting the most important NAL units in the group. In some embodiments, more important NAL units have higher QL identifier values. For the calculations below we associate a value to the QL identifier for the base layer NAL unit, QL(io), that is larger than the maximum allowed QL identifier value for enhancement layer NAL units.

The transmission rate decisions for each enhancement layer NAL unit $i_k$ (0<k<L) of the current frame i are determined as follows.

Define N as the set of NAL units in the group that are more important than the current NAL unit $i_k$.

Elements of N satisfy the following condition:

$$j_s \in N \text{ if } QL(j_s) > QL(i_k), j \in G \text{ and } 0 \leq s < L$$

The current NAL unit $i_k$ is discarded entirely if the bit-budget is too small for the NAL units more important than $i_k$:

$$r(i_k) = 0, \text{ if: } R_G < \sum_{j_s \in N} v(j_s).$$

Otherwise, the transmission rate for the current NAL unit $i_k$ is determined as described below.

Let us define P as the set of NAL units in the group G that have the same importance as the current NAL unit $i_k$. Thus:

$$j_s \in P \text{ if } QL(j_s) == QL(i_k), j \in G \text{ and } 0 < s < L$$

The current NAL unit $i_k$ is transmitted entirely if the bit-budget is large enough for all the NAL units belonging to the union of set N and set P.

$$r(i_k) = v(i_k), \text{ if: } R_G \geq \sum_{j_s \in (N \cup P)} v(j_s).$$

Otherwise, in some embodiments, the transmission rate assigned to the current NAL unit $i_k$ can be calculated using any one of the following algorithm variants:

Approach 1: This approach treats all the NAL units in the set P equally and thus all the NAL units in P are truncated by the same ratio:

$$r(i_k) = v(i_k) \frac{\left(R_G - \sum_{j_s \in N} v(j_s)\right)}{\sum_{n_s \in P} v(n_s)}$$

Approach 2: This approach uses the remaining bits greedily by treating the current NAL unit $i_k$ favorably compared to other NAL units belonging to the set P:

$$r(i_k) = \min\left(R_G - \sum_{j_s \in N} v(j_s), v(i_k)\right)$$

Approach 3: This approach allocates the remaining bits first to other NAL units (excluding the current NAL unit $i_k$) belonging to the set P before assigning them to the current NAL unit $i_k$:

$$r(i_k) = \max\left(0, R_G - \sum_{j_s \in N} v(j_s) - \sum_{j_s \in (P \setminus i_k)} v(j_s)\right)$$

Note that truncation of this NAL unit is only allowed if the layer is coded in fine-grained scalable (FGS) manner or a similar method. Otherwise, this NAL unit may be discarded entirely.

In embodiments that apply this method to an SVC bitstream which contains CGS and/or MGS, the above process may be simplified. The simplified process of these embodiments can result in reduction in the number of computations and lower complexity. The selected NAL units for transmission and the computed truncation ratios when using the simplified process may remain the same as described above.

SVC Rate Adaptation Based on SNR and Temporal Scalability

Figure 6:
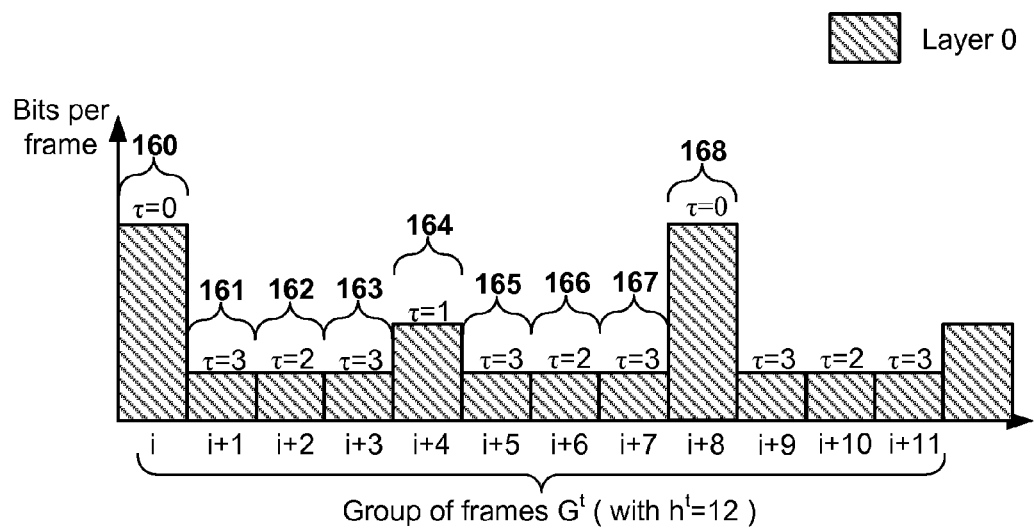
FIG. 6 is a diagram showing an exemplary bit stream structure with an exemplary assignment of temporal level values.

Some embodiments of the present invention may evaluate a frame based on a temporal level value. Some of these embodiments may be described in relation to FIG. 6. In these embodiments, NAL units in a frame may be assigned a temporal level value based on the frame's status in a prediction scheme. The temporal level value of a unit may be based on the number of dependent frames in the prediction scheme. Accordingly, an I-frame 160, 168 may be assigned a temporal level value of O, while a P-frame 164, predicted from an I-frame 160, may be assigned a temporal level value of 1. A B-frame 162, 166 that is predicted from a P-frame 164, that is, in turn, predicted from another I-frame 160, may be assigned a temporal level value of 2. Any hierarchical B-frames 161, 163, 165, 167 predicted from a B-frame 162, 166 may be assigned a temporal level value of 3. Transmission priority may then be allocated to units with the lowest temporal level value first with marginal units being truncated or omitted from a transmission.

In some embodiments of the present invention, if the rate reduction achieved by SNR scalability is not sufficient to prevent playout buffer underflows, further rate adaptation can be performed by reducing the temporal resolution of the video. In these embodiments, temporal scalability may be effectively achieved by discarding the SNR base layer data of certain video frames. This rate adaptation method based on temporal scalability may use the time-scale concept. Some embodiments may maximize the number of correctly decoded frames in the group while maintaining delay constraints.

In some embodiments, the system may decide whether the current frame is transmitted or dropped based on the importance of the frame in terms of its temporal level τ(i). Frames with a lower temporal level may be considered as more important than frames with a higher temporal level, since frames with a lower temporal level are used as a reference for prediction of frames with a higher temporal level.

In some embodiments, if the base layer cannot be transmitted in-budget, temporal scalability may be invoked. If the group bit-budget computed for SNR scalability is smaller than the total (bit) size of the SNR base layer NAL units of the frames in the group, i.e., $$R_G < \sum_{j \in G} v(j_0),$$

temporal scalability may be implemented. Temporal scalability may decide to discard the base layer data of certain frames, in addition to the enhancement layer data that may already have been discarded according to embodiments described above.

In these embodiments, the bit-budget may be considered for a group of frames $G^t$, where the size of this group may be different than the size of the group G defined for SNR scalability. In some embodiments, it may be advantageous to use a larger group for the purpose of temporal scalability. In some embodiments, longer time scales for temporal scalability result in better performance. The new frame group is defined as: $G^t = \{i, i+1, \ldots, i+h^t-1\}$.

The new transmission bit-budget is computed as follows:

$$R^t G = \hat{H} \cdot [(h^t-1)\Delta T + F^t \cdot \Delta T_E] - \hat{B} \quad (4)$$

Subsequently, the NAL unit with the base layer of the current frame (NAL unit $i_0$) is transmitted, if the bit-budget is large enough for this NAL unit as well as other NAL units in the group that are more important in terms of temporal level:

$$r(i_0) = v(i_0), \text{ if: } R^t G \geq v(i_0) + \sum_{\tau(j) < \tau(i)} v(j_0) \text{ for } j \in G^t.$$

Otherwise, NAL unit $i_0$ is discarded, effectively dropping frame i entirely:

$$r(i_o) = 0, \text{ if: } R^t G < v(i_0) + \sum_{\tau(j) < \tau(i)} v(j_0) \text{ for } j \in G^t.$$

In these embodiments, the system may decide to transmit the base layer NAL unit ($i_0$) irrespective of the bit budget, if the frame is considered a very important frame, for example on the basis of the temporal level of the frame τ(i).

Delayed NAL Unit Transmission

In some embodiments, an additional method, named Delayed NAL Unit Transmission, may be used as an extension of the previous two scalability methods, in combination with other methods or on its own. In some embodiments explained previously, NAL units may have only one transmission opportunity at their first scheduled transmission time. These embodiments perform well when the initial buffering duration is relatively long, for example longer than 300 ms, by fully utilizing the channel when necessary. At relatively short delay tolerances, the streaming system may not utilize the full channel bandwidth efficiently due to relatively large rate reductions. Large rate adjustments may occur when the h and F parameters are set to small values, in order to prevent buffer under-runs.

Embodiments comprising delayed transmission may detect idle channel intervals, e.g., instances when the channel is not fully utilized, and subsequently transmit previously dropped or truncated NAL units whose decoding deadlines have not yet expired. Hence, better channel utilization is achieved by the delayed transmission of NAL units, i.e., at later transmission opportunities. These embodiments may also utilize quality layer (QL) information for selecting the most important NAL unit that is not expired and eligible for delayed transmission.

In some embodiments, idle channel intervals may be detected using feedback messages of the client, which are sent after a burst is received. In the case of a wireless link, the channel will stay idle after the most recent burst transmission is acknowledged, i.e., the channel backlog is zero, and if there is still time left until the transmission time for the next frame. Hence, the delayed NAL unit transmission stage may be initiated after a feedback message has been received.

First, the bit-budget for the idle interval may be determined as follows:

$$R_I = \hat{H} \cdot (t_{i+1} - c_{fb}) \quad (5)$$

In this expression $t_{i+1}$ is the scheduled transmission time of the next frame (i+1), and $C_{fb}$ is the receive time of the latest feedback indicating the channel backlog is empty. Delayed transmission can be disabled in cases where the idle interval is shorter than a threshold (λ), i.e. $(t_{i+1} - c_{fb}) < \lambda$.

Next, the most important, not-expired and previously discarded/truncated NAL unit is determined. In some embodiments, SNR base layers are always more important than the enhancement layers.

Define the set of NAL units eligible for delayed transmission, E, as:

$$j_k \in E, \text{ if: } t_j + \beta \cdot \Delta T_E \leq t_{i+1} \text{ and } r(j_k) < v(j_k).$$

In this definition $t_j$ is the initial transmission time of frame j. β is a constant safety factor, with $0 \leq \beta \leq 1$, that can be used to disable the delayed transmission of NAL units whose deadline is too close. Additional tests may be performed to determine eligibility of a NAL unit. For example, the expected transmission duration of the NAL unit may also be tested.

Determine the most important NAL unit in E as the NAL unit with maximum Quality Layer identifier:

$$a_b = \underset{j_k \in E}{\mathrm{argmax}}[QL(j_k)] \quad (6)$$

If multiple NAL units in E share the same maximum quality layer, the one with the minimum frame sequence number is selected. If the Quality Layer information is not available, $a_b$ can be chosen as the oldest and lowest SNR layer in E.

Next, the size of NAL unit $a_b$ when performing delay transmission, $d(a_b)$, is calculated as follows.

If $a_b$ is an SNR base layer, i.e. b=0, transmit it entirely, since base layers can not be truncated.

$$d(a_b) = v(a_b), \text{ if: } b=0. \quad (7)$$

If $a_b$ is an SNR enhancement layer, i.e. b>0, the remaining bits/bytes of the NAL unit may be transmitted up to the calculated bit-budget:

$$d(a_b) = \min[R_I, v(a_b) - r(a_b)], \text{ if: } b>0. \quad (8)$$

In some embodiments, truncation of this NAL unit is only allowed if the layer is coded in fine-grained scalable (FGS) manner. Otherwise, this NAL unit is transmitted in its entirety only if the entire NAL unit fits into the calculated bit-budget for delayed transmission $d(a_b)$.

The total transmission size of NAL unit $a_b$ is updated after the delayed transmission:

$$r(a_b) = r(a_b) + d(a_b) \quad (9)$$

Finally, the client station may send a feedback message after receiving the delayed NAL unit packet burst.

Optionally, in some embodiments, the above process may be repeated for the next most important NAL unit in E after updating the bit budget:

$$R_I = R_I - d(a_b), \text{ if } R_I > 0.$$

Let N be the maximum number of delayed NAL units that the system is allowed to transmit before another feedback message is received. N is equal to 1 in case transmission of multiple delayed NAL units before getting another feedback message is not allowed during delayed NAL unit transmission. N is equal to the size of E in case transmission of multiple delayed NAL units is allowed. Alternatively, N can be set to any fixed number by the system. Naturally, multiple delayed NAL unit transmissions are allowed only to the extent allowed by the bit budget.

In some embodiments, the delayed NAL unit transmission stage is initiated every time a feedback message from the client is received. Therefore, it is possible that the delayed NAL unit transmission stage is initiated multiple times in a single frame interval. Every time this stage is initiated, the process starts by checking if an idle interval is detected, computing the remaining bit budget, etc.

Algorithm Pseudo-Code

The following pseudo-code may be used to describe methods of some embodiments of the present invention comprising invocation of adaptive transmission and conditional delayed transmission of NAL units.

```
transmit_frame
begin
    adaptive_transmission_of_NAL_units_of_current_frame
end
receive_feedback
begin
    update the expected channel bandwidth
    d1 = decide_to_invoke_delayed_NAL_unit_transmission
    if (d1 == true)
    then
        adaptive_delayed_transmission_of_NAL_units_of_current_and_previous_frames
    endif
end
```

The following pseudo-code may be used to describe methods of some embodiments of the present invention comprising adaptive transmission of NAL units.

```
adaptive_transmission_of_NAL_units_of_current_frame begin
    determine the current channel backlog
    determine the expected channel bandwidth
    determine the group of frames G
    d2 = determine_whether_all_NAL_units_in_G_can_be_transmitted
    if (d2 == true)
    then
        transmit all NAL units of the current frame
    else
        d3 = determine_whether_all_base_layer_NAL_units_in_G_can_be_transmitted
        if (d3 == true)
        then
            transmit base layer NAL units of the current frame
            adaptive_snr_scalable_transmission
        else
            discard enhancement layer NAL units of the current frame
            adaptive_temporal_scalable_transmission
        endif
    endif
end
```

The following pseudo-code may be used to describe methods of some embodiments of the present invention comprising partial transmission of enhancement layer NAL units.

```
                    adaptive_snr_scalable_transmission
begin
    for enhancement layer k = 1 ... L-1
        d4 = determine_whether_layer_k_NAL_units_can_be_transmitted
        if (d4 == true)
            transmit layer k NAL units of current frame
        else
            d5 = determine_whether_layer_k_NAL_units_can_be_partially_transmitted
            if (d5 == true)
                truncate layer k NAL units of current frame
                partially transmit layer k NAL units of current frame
            else
                discard layer k NAL units of current frame
            endif
        endif
    endfor
end
```

The following pseudo-code may be used to describe methods of some embodiments of the present invention comprising temporal scalability.

```
                    adaptive_temporal_scalable_transmission
begin
    determine the group of frames G^t
    d6 = determine_whether_current_base_layer_NAL_unit_can_be_transmitted
    if (d6 == true)
        transmit layer 0 NAL unit of current frame
    else
        discard layer 0 NAL unit of current frame
    endif
end
```

The following pseudo-code may be used to describe methods of some embodiments of the present invention comprising adaptive delayed transmission of NAL units.

```
    adaptive_delayed_transmission_of_NAL_units_of_current_and_previous_frames
begin
    determine bit budget for delayed NAL unit transmission
    determine set of NAL units eligible for delayed transmission E
    determine priority order of eligible NAL units
    for eligible NAL unit with priority index j = 1 ... N
        d7 = determine_whether_NAL_unit_can_be_transmitted
        if (d7 == true)
            transmit j^th NAL unit
        else
            d8 = determine_whether_NAL_unit_can_be_partially_transmitted
            if (d8 == true)
                truncate j^th NAL unit
                partially transmit j^th NAL unit
            else
                discard j^th NAL unit
            endif
        endif
        update bit budget for delayed NAL unit transmission
    endfor
end
```

Figure 7:
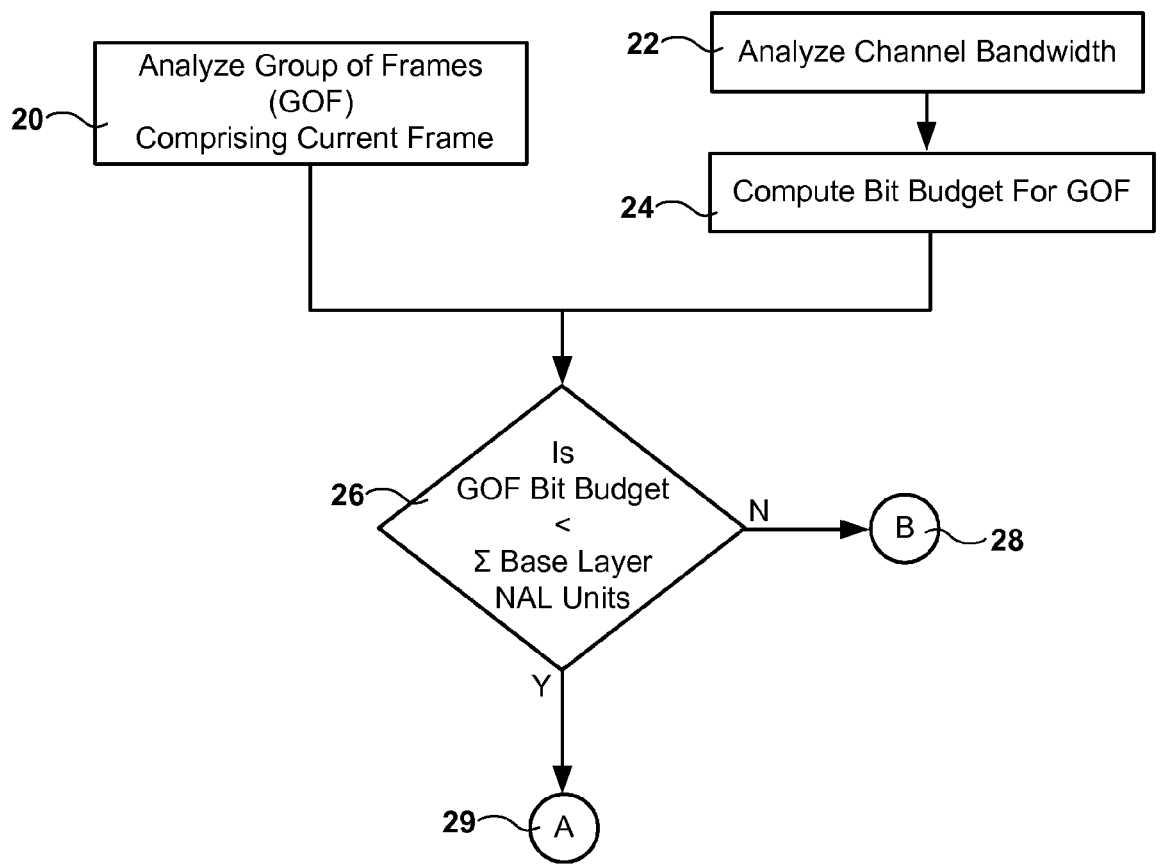
FIG. 7 is a diagram showing an exemplary embodiment comprising analysis of a bit budget in comparison to the size of a base layer.

Aspects of some embodiments of the present invention may be described with reference to FIG. 7. In these embodiments, a group of frames (GOF) may be analyzed 20 to determine the size of the GOF in bits, bytes, or some other measure of memory needed to store or transmit the GOF. In some embodiments, the size of each frame within the GOF and each layer within each frame may also be determined. In some embodiments, the size of each frame's base layer and any enhancement layers may be determined.

In these embodiments, communication bandwidth is also analyzed 22 to determine the bandwidth of the communication medium over which a signal may be sent. Based on the available bandwidth, a GOF bit budget may be computed 24. The bit budget may represent an estimate of the amount of data that may be transmitted across the communication medium at the time of the estimate.

Once a bit budget is established, the bit budget may be compared 26 to the size of frame elements within the GOF. Typically, a comparison is made to determine whether the bit budget is larger than the total size of all base layers in the GOF. If the bit budget is larger than the sum of all the base layers in the GOF, a further analysis 28 may be performed to determine what additional elements of the frame, such as enhancement layers, may be transmitted along with the base layer. If the bit budget is smaller than the sum of all the base layers in the GOF, a determination 29 may be made to ascertain what base layer units may be discarded.

Figure 8:
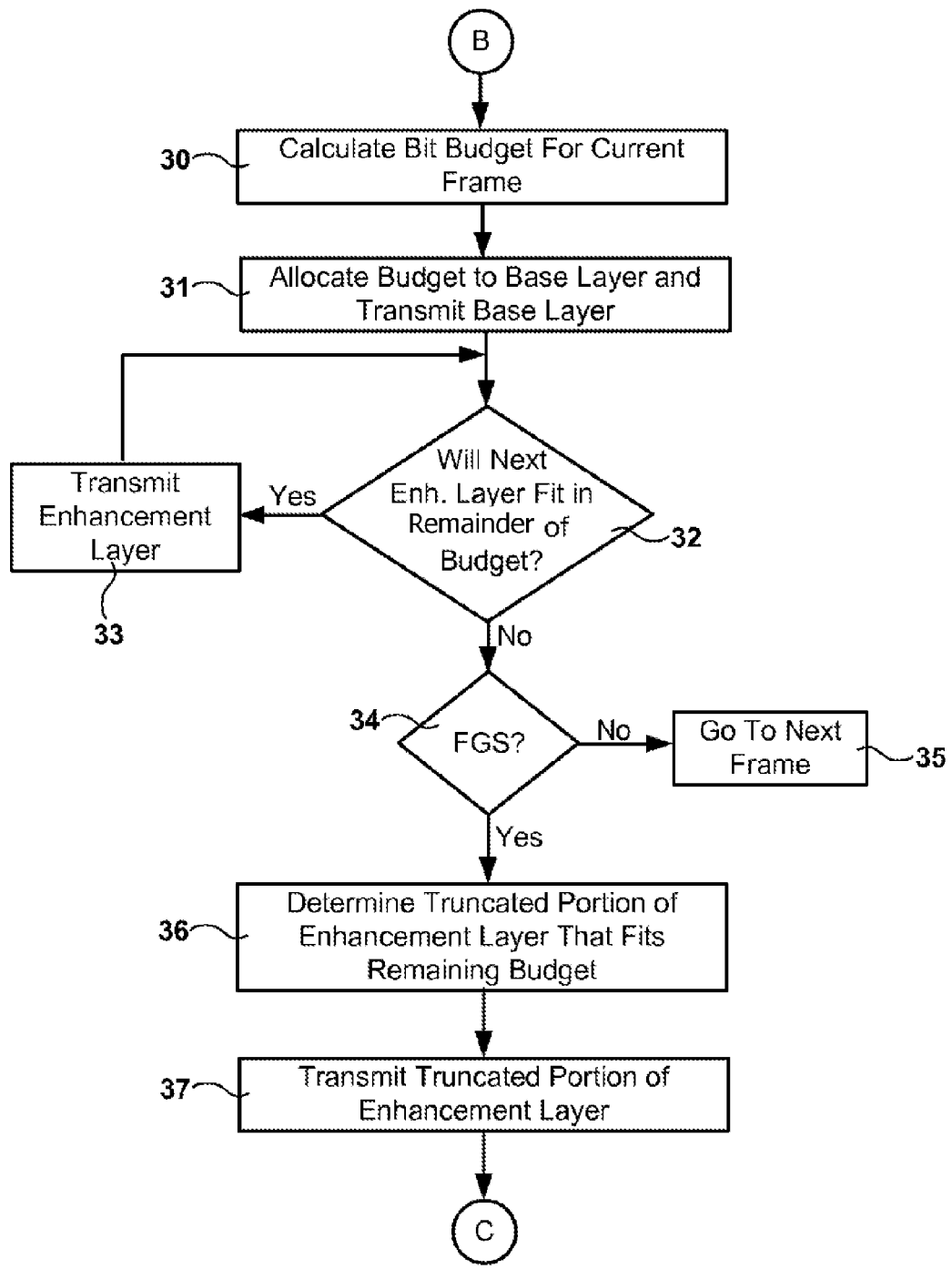
FIG. 8 is a diagram showing an exemplary embodiment comprising transmission of a truncated portion of an enhancement layer.

Aspects of some embodiments of the present invention may be described with reference to FIG. 8. In these embodiments, once it has been determined that a base layer fits within the bit budget for a GOF, a bit budget for a current target frame may be determined 30. The base layer may then be allocated 31 to the current frame bit budget leaving a current frame budget remainder. The base layer may be transmitted at this time if it has not already been transmitted or it may be selected for transmission at some later time. In some embodiments, the size of the next most important enhancement layer may then be compared 32 to the current frame budget remainder. If the budget remainder is at least as large as the next most important enhancement layer, that enhancement layer may be allocated to the budget thereby creating an updated budget, remainder and the enhancement layer may be transmitted 33. This process may be repeated until all enhancement layers for the current frame have been transmitted or until the next most important enhancement layer is larger than the updated budget remainder.

In some embodiments, when the next most important enhancement layer will not fit in the updated budget remainder, it may be determined 34 whether portions of an enhancement layer may be transmitted. In some embodiments, a layer may be divided into smaller elements, such as through Fine Grain Scalability (FGS) in some AVC/SVC-related embodiments. If a layer is not divisible (e.g., not FGS) the remaining enhancement layer may be discarded or otherwise omitted from the current transmission schedule 35 and the process may proceed to the next frame.

If a signal is encoded in a format that allows layer divisibility (e.g., FGS), the enhancement layer that did not fit into the updated budget remainder may be truncated 36 to the size of the budget remainder. The truncated layer portion 37 may then be transmitted with the other more important layers.

In some embodiments, after the bit budget for each frame is exhausted, a new GOF may be selected for the next frame in the sequence and the above process may be repeated for the next frame.

Figure 9:
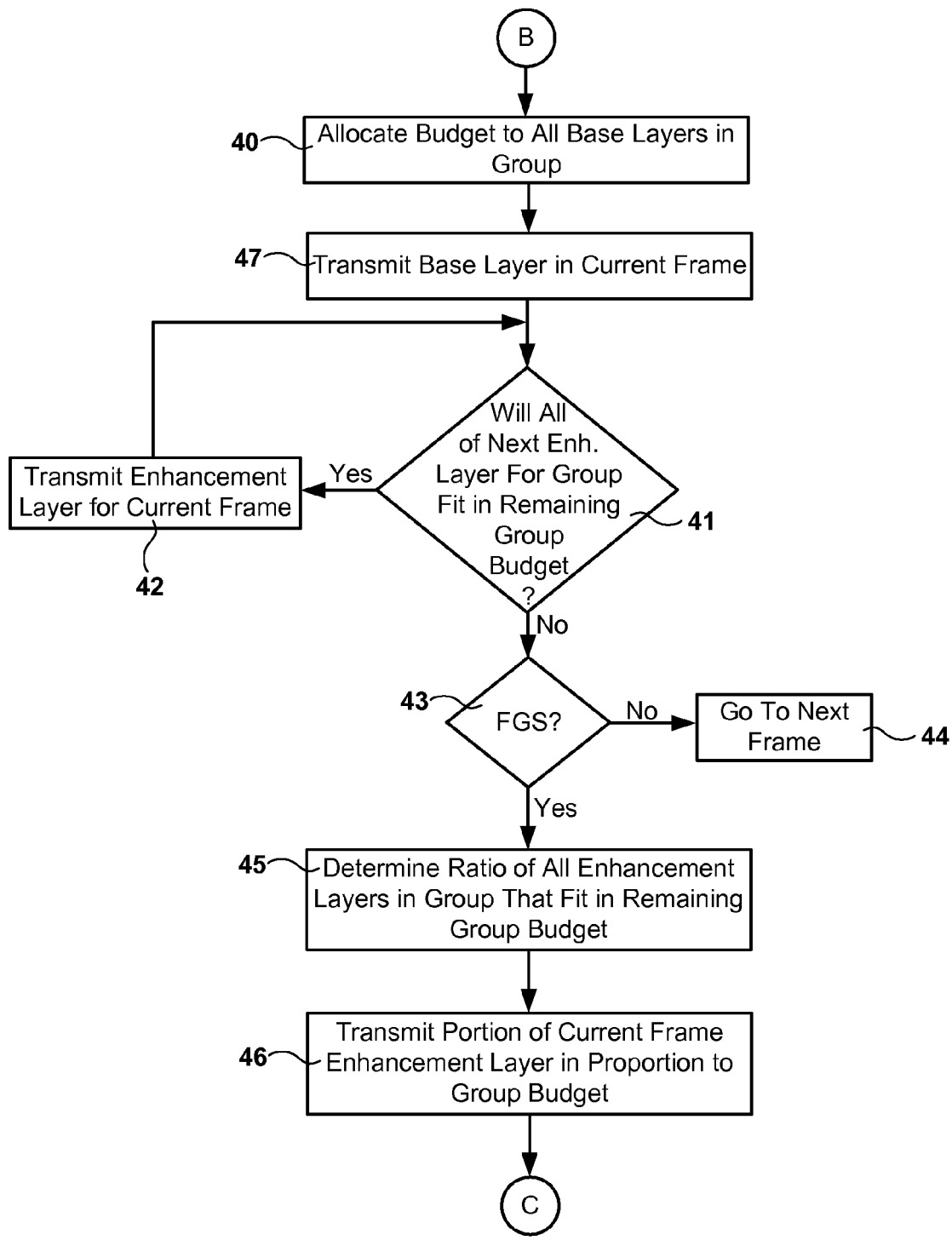
FIG. 9 is a diagram showing an exemplary embodiment comprising transmission of a current frame's enhancement layer in proportion to a group budget.

Aspects of some embodiments of the present invention may be described with reference to FIG. 9. In these embodiments, once it is determined that the base layer for all frames in the GOF will fit in the GOF bit budget 28, the size of all base layers is allocated 40 to the GOF bit budget thereby creating a GOF bit budget remainder. The base layer for the current frame may then be transmitted 47. The next most important enhancement layer is then examined. When the size of the next most important enhancement layer for all frames in the GOF is smaller than the GOF bit budget remainder 41, that layer size is allocated to the GOF bit budget remainder thereby creating an updated GOF bit budget remainder. The allocated enhancement layer for the current frame is then transmitted 42 or selected for later transmission. This process may be repeated for each enhancement layer in a frame until all enhancement layers have been transmitted or until an enhancement layer is smaller than the updated GOF bit budget remainder.

In some embodiments, when the next most important enhancement layer will not fit in the updated GOF bit budget remainder, it may be determined 43 whether portions of an enhancement layer may be transmitted. In some embodiments, a layer may be divided into smaller elements, such as through Fine Grain Scalability (FGS) in some AVC/SVC-related embodiments. If a layer is not divisible (e.g., not FGS) the remaining enhancement layer may be discarded or otherwise omitted from the current transmission schedule 44 and the process may proceed to the next frame.

If a signal is encoded in a format that allows layer divisibility (e.g., FGS), the enhancement layer that did not fit into the updated GOF bit budget remainder may be truncated 45 to the size of the budget remainder. The truncated layer portion 46 may then be transmitted with the other more important layers or otherwise selected for transmission.

In some embodiments, after the GOF bit budget is exhausted and as much of the current frame has been selected for transmission as possible under this method, a new GOF may be selected for the next frame in the sequence and the above process may be repeated for the next frame.

Figure 10:
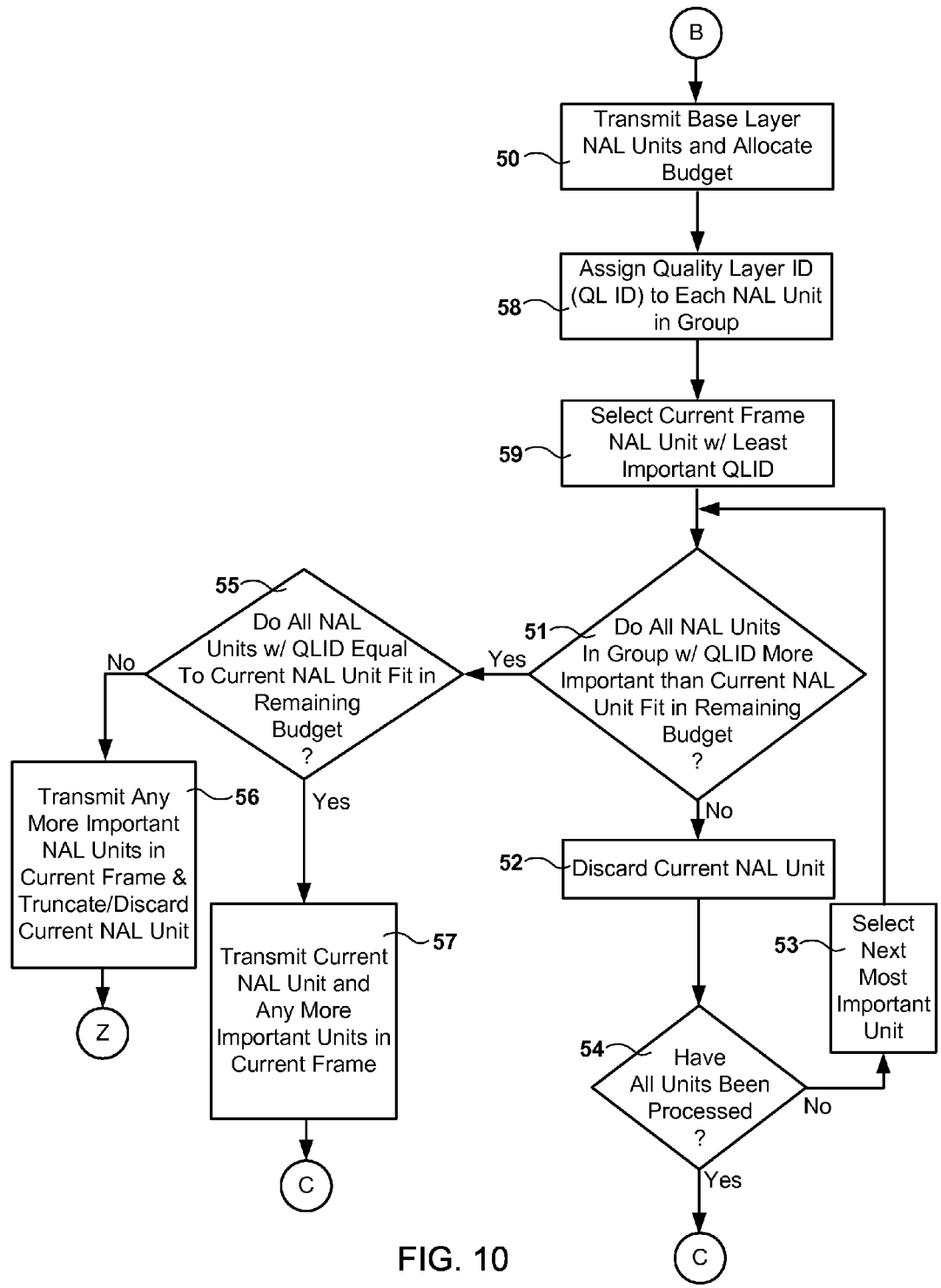
FIG. 10 is a diagram showing an exemplary embodiment comprising allocation of transmission bandwidth according to a quality layer identification.

Aspects of some embodiments of the present invention may be described with reference to FIG. 10. In these embodiments, it has been determined that the base layer NAL units fit in the group bit budget in step 26 of FIG. 7 so the base layer NAL units are transmitted or selected for transmission 50. The size of these base layer units may then be allocated against the group bit budget thereby creating a remaining group bit budget. In these embodiments, a Quality Layer Identification (QLID) may be assigned 58 to each layer of each frame in the GOF. Each layer may be encoded in a unit, such as a Network Abstraction Layer (NAL) unit. The QLID may relate each unit to its importance relative to the perceived quality of the signal. In some embodiments, a base layer QLID may be more important than a first enhancement layer, which may be more important than a second enhancement layer. Furthermore, an I-frame may be more important than a P-frame, which may be more important than a B-frame. In some embodiments, the QLID may be assigned based on the distortion of the signal when the unit is omitted.

Once QLIDs have been assigned 58 to each layer or unit, each unit in the current frame starting 59 with the least important and progressing to most important may be analyzed in succession.

This analysis 51 may determine whether all units in the GOF with a QLID more important than the current frame's unit fit in the remaining GOF bit budget. If so, it is then determined 55 whether all units in the GOF with a QLID equal to the current frame's unit fit in the remaining GOF bit budget. If all units with a QLID equal to the current unit fit in the remaining GOF bit budget, the current unit and any more important units in the current frame may be transmitted or selected for transmission 57. If all units with a QLID equal to the current unit do not fit in the remaining GOF bit budget, the current unit may be discarded or omitted 56 from transmission at the current time. When units are divisible, the current unit may be truncated according to a variety of methods. Some exemplary methods are described below in relation to FIG. 11.

If all units in the GOF with a QLID more important than the current frame's unit do not fit in the remaining GOF bit budget, the current frame's unit is discarded 52 or otherwise omitted from transmission at the current time. The process may then proceed to the next most important unit 53 in the current frame and repeat until all units in the current frame are processed 54.

Figure 11:
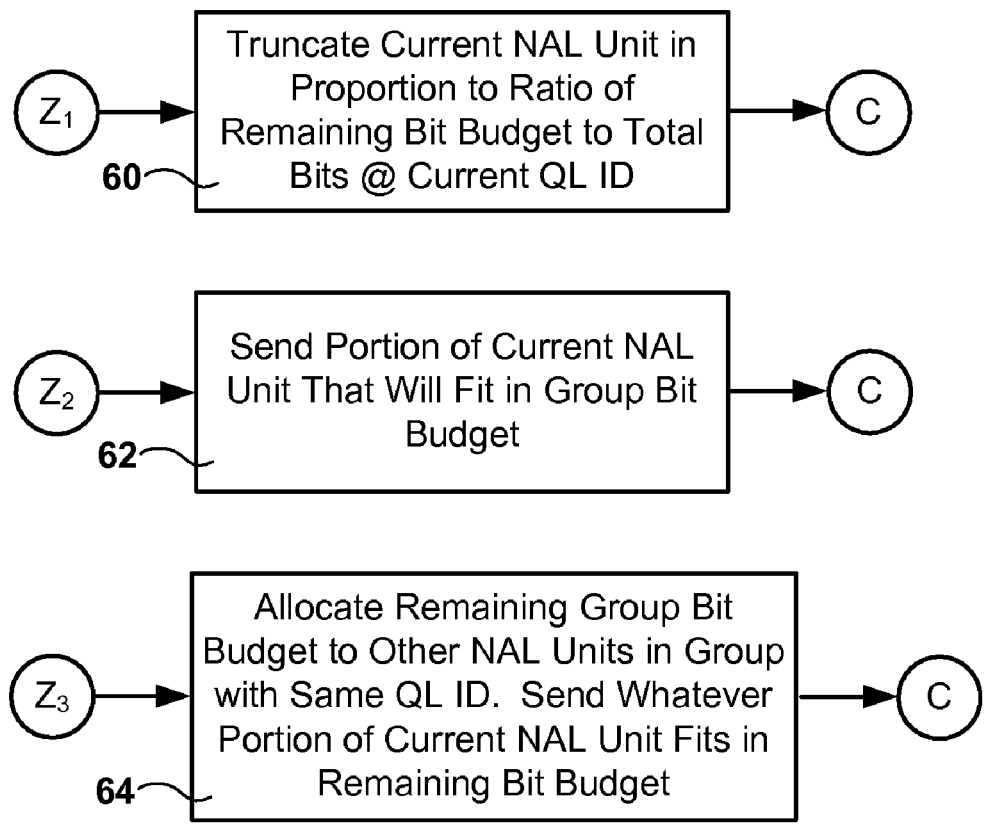
FIG. 11 is a diagram showing an exemplary embodiment comprising alternative truncation methods.

In some embodiments of the present invention, when all units with a QLID equal to the current frame's unit do not fit in the GOF bit budget, any NAL units more important that the current NAL unit may be transmitted and the current frame's unit may be truncated 56. In an exemplary embodiment, shown in FIG. 11, the current unit may be truncated 60 in proportion to the ratio of the remaining GOF bit budget to the total size of units with a QLID equal to the QLID of the current frame's unit. In an alternative exemplary embodiment 62, whatever portion of the current frame's unit will fit in the remaining GOF bit budget may be transmitted or selected for transmission. In yet another exemplary embodiment 64, the remaining GOF bit budget may be allocated to other units with the same QLID as the current frame's unit. After this allocation, whatever portion of the current frame's unit will fit in the remaining GOF bit budget may be transmitted or selected for transmission. After these allocation methods 60, 62, and 64, described in relation to FIG. 11, are performed, these methods may proceed to supplementary allocation and transmission processes such as those described in relation to FIGS. 13 and 14.

Figure 12:
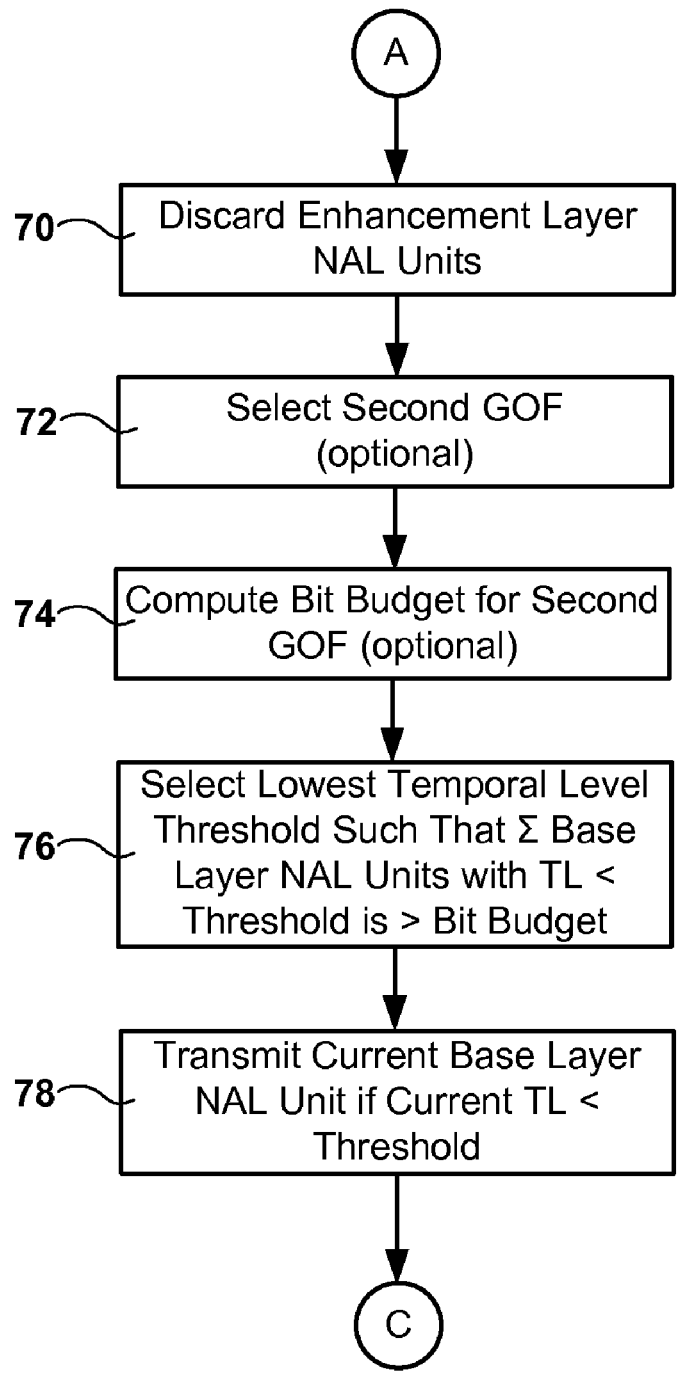
FIG. 12 is a diagram showing an exemplary embodiment comprising allocation of bandwidth to base layer units based on temporal level values.

Aspects of some embodiments of the present invention may be described in relation to FIG. 12. In these embodiments, a GOF is selected, a GOF bit budget is determined and the size of base layers of frames in the GOF is determined. When all base layers do not fit in the GOF bit budget, all enhancement layer units may be discarded or omitted from transmission at the current time 70.

In some embodiments, a second GOF may be selected 72 when all base layers do not fit in the budget. Typically, a larger GOF comprising more frames may be selected. A second GOF bit budget may be calculated 74 or estimated for this second GOF. In alternative embodiments, the original GOF and GOF bit budget may be used.

In these embodiments, a temporal level is assigned to each base layer unit. In some embodiments, the temporal level may relate to the number of frames through which a frame is predicted or may otherwise relate to the importance of a frame in the prediction of other frames. In these embodiments, a lower temporal level indicates greater importance.

In some embodiments, the base layer units may be selected 76 in order of most important temporal level until the bit budget is exhausted. This may be done by selecting a temporal level threshold or by other methods. In some embodiments, a threshold value may be selected as the lowest temporal level value such that the sum of the base layer NAL units with a temporal level less than the threshold value is greater than the bit budget 76. In some embodiments, base layer NAL units may be transmitted or selected for transmission 78 when their temporal level is less than the threshold value. In other embodiments, if the current frame's base layer unit has a temporal level that is important enough to fall within the bit budget, the unit may be transmitted 78 or selected for transmission.

Figure 13:
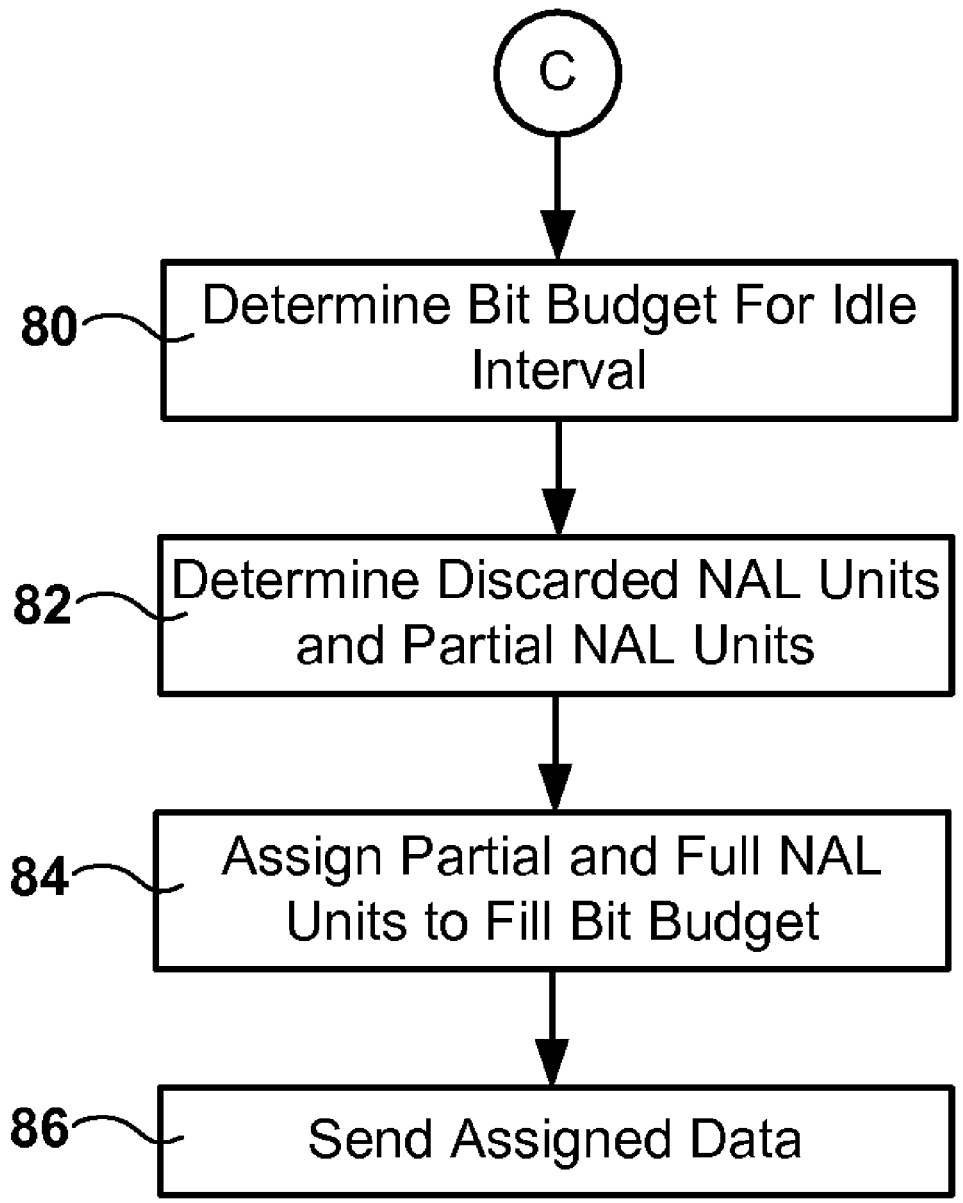
FIG. 13 is a diagram showing an exemplary embodiment comprising calculation of an additional bit budget during an idle interval.

Aspects of some embodiments of the present invention may be described in relation to FIG. 13. In these embodiments, units for frames have already been selected and transmitted by methods described above or by other methods and some units have been omitted from transmission. After transmission of these frames, it may be determined that the transmission medium has available bandwidth, such as during an idle interval. In these embodiments, a supplementary bit budget may be determined 80 for this interval. Untransmitted units for the previously transmitted frames may also be determined 82. These untransmitted units may be assigned 84 to the supplementary bit budget. These units may be assigned using methods described above or by other methods. The assigned units may then be transmitted 86 during this interval.

Figure 14:
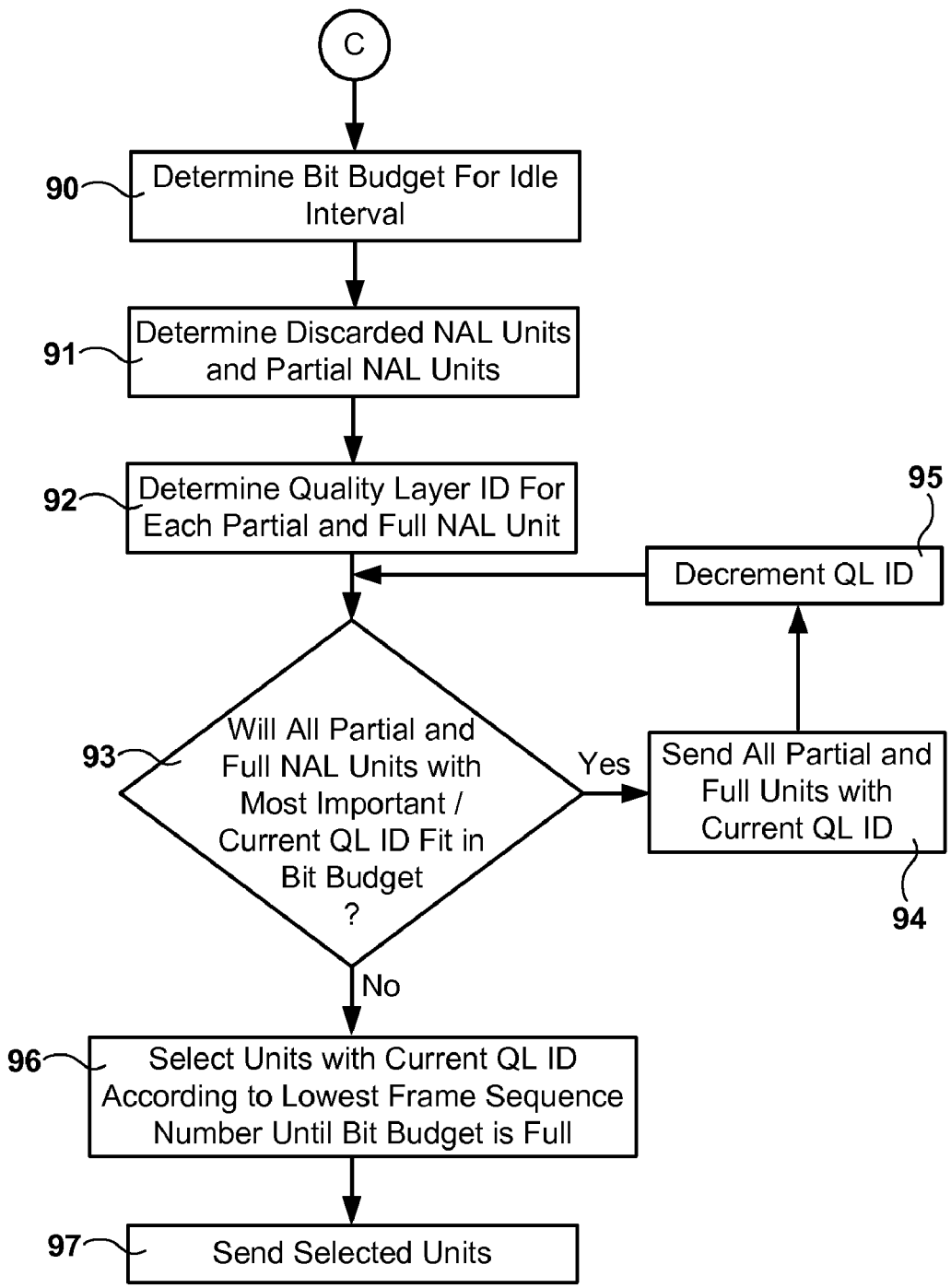
FIG. 14 is a diagram showing an exemplary embodiment comprising allocation of idle interval bandwidth using quality layer identification values.

Aspects of some embodiments of the present invention may be described in relation to FIG. 14. In these embodiments, units for frames have already been selected and transmitted by methods described above or by other methods and some units have been omitted from transmission. After transmission of these frames, it may be determined that the transmission medium has available bandwidth, such as during an idle interval. In these embodiments a supplementary bit budget may be determined 90. This supplementary bit budget may be based on transmission medium status and conditions after the initial transmission was sent. Full units and partial units that were previously omitted from transmission may be considered 91 for transmission. These units may be assigned a QLID if an assignment has not already been made 92. Each unit may then be evaluated according to its QLID. A determination 93 may then be made to determine whether all partial and full units with QLID above a threshold level will fit in the supplementary bit budget. If all units at the current QLID fit in the bit budget, all these units may be transmitted or selected for transmission 94. The level may then be decremented 95 and the process repeated until the bit budget is exhausted.

When all units at a particular QLID do not fit in the bit budget, those units at the current QLID threshold that have the lowest frame sequence number may be selected until the bit budget is exhausted 96. When the bit budget is exhausted, the selected units may be transmitted 97.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method comprising:
   determining a value of an initial size of a group of frames (GOF) comprising a current frame, the initial size comprising all Network Abstraction Layer (NAL) units in said GOF;
   determining a current frame bit budget for said current frame wherein said current frame bit budget is proportional to: a total size of all NAL units in said current frame multiplied by a ratio of a GOF bit budget for said GOF to the initial size of said GOF;
   allocating a portion of said current frame bit budget to a value of a size of a current frame base layer NAL unit thereby determining a current frame bit budget remainder;
   authorizing transmission of said current frame base layer NAL unit;
   allocating a next portion of said current frame bit budget remainder to a next most important enhancement layer NAL unit thereby determining an adjusted current frame bit budget remainder if a size of said next most important enhancement layer NAL unit is less than said current frame bit budget remainder;
   authorizing transmission of said next most important enhancement layer NAL unit if the size of said next most important enhancement layer NAL unit is less than said adjusted current frame bit budget remainder;
transmitting if said adjusted current frame bit budget remainder is less than a last most important enhancement layer NAL unit;
truncating said last most important enhancement layer NAL unit to fit in said adjusted current frame bit budget remainder and transmitting said truncated last most important enhancement layer NAL unit when a scalable signal is encoded with Fine Grain Scalability (FGS); and
discarding said last most important enhancement layer NAL unit, when said scalable signal is not encoded with FGS.

2. The method of claim 1 further comprising:
determining an updated bit budget based on an updated available transmission bandwidth after transmission of said current frame base layer NAL unit and any next most important layer NAL units;
allocating a determined set of unsent NAL units and a determined set of partially-unsent NAL units to said updated bit budget until said updated bit budget is expended; and
authorizing said allocated determined set of unsent NAL units and said allocated determined set of partially-unsent NAL units for transmission.

3. The method of claim 1 further comprising:
determining an updated bit budget based on an updated available transmission bandwidth after transmission of said current frame base layer NAL unit and any next most important layer NAL units;
determining a quality layer identification (QLID) for a determined set of unsent NAL units and a determined set of partially-unsent NAL units; and
authorizing the determined set of unsent NAL units and the determined set of partially-unsent NAL units for transmission based on an allocation of the determined set of unsent NAL units and the determined set of partially-unsent NAL units to the updated bit budget in order of QLID until the updated bit budget is expended.

4. A method comprising:
determining a current frame bit budget based on a group of frames (GOF) bit budget, wherein the GOF bit budget is based on a set of Network Abstraction Layer (NAL) units, and wherein the current frame bit budget is proportional to a value of a total size of the set of NAL units multiplied by a ratio of the GOF bit budget to a value of an initial size of the GOF;
determining a current frame bit budget remainder based on an allocation of a portion of the current frame bit budget to a value of a size of a current frame base layer;
determining an adjusted current frame bit budget remainder based on a value of a size of a subsequent current frame enhancement layer being less than the determined current frame bit budget remainder, and based on an allocation of a next portion of the current frame bit budget remainder to the value of the size of the subsequent current frame enhancement layer;
truncating a last most important enhancement layer NAL unit to fit in the adjusted current frame bit budget remainder and transmitting the truncated last most important enhancement layer NAL unit when a scalable signal is encoded with Fine Grain Scalability (FGS); and
discarding said last most important enhancement layer NAL unit, when the scalable signal is not encoded with FGS.

5. The method of claim 4 wherein the current frame comprises a set of one or more layers, wherein the one or more layers are at least one of: a base layer and an enhancement layer.

6. The method of claim 4 wherein the current frame base layer is characterized by a set of NAL units.

7. The method of claim 4 wherein the subsequent current frame enhancement layer is characterized by a set of NAL units.

8. The method of claim 4 wherein the total size of the set of NAL units is encoded with Fine Grain Scalability (FGS).

9. The method of claim 4 wherein the set of NAL units is associated with a quality layer identification (QLID) value.

10. The method of claim 4 further comprising:
transmitting scalable audiovisual data signals, the audiovisual data signals comprising the GOF, wherein the transmitting is based on the determined current frame bit budget remainder and the determined adjusted current frame bit budget remainder.

11. A system comprising:
a server device, operably coupled to a client device via a communication medium, the server device configured to:
determine a current frame bit budget based on a group of frames (GOF) bit budget, wherein the GOF bit budget is based on a set of Network Abstraction Layer (NAL) units, and wherein the current frame bit budget is proportional to a value of a total size of the set of NAL units multiplied by a ratio of the GOF bit budget to a value of an initial size of the GOF;
determine a current frame bit budget remainder based on an allocation of a portion of the current frame bit budget to a value of a size of a current frame base layer;
determine an adjusted current frame bit budget remainder based on a value of a size of a subsequent current frame enhancement layer being less than the determined current frame bit budget remainder, and based on an allocation of a next portion of the current frame bit budget remainder to the value of the size of the subsequent current frame enhancement layer;
truncate a last most important enhancement layer NAL unit to fit in the adjusted current frame bit budget remainder and transmit the truncated last most important enhancement layer NAL unit when a scalable signal is encoded with Fine Grain Scalability (FGS); and
discard the last most important enhancement layer NAL unit, when the scalable signal is not encoded with FGS; and
a client device configured to:
receive a transmission of scalable audiovisual data signals from the server device, the audiovisual data signals comprising the GOF, wherein the transmission is based on the determined current frame bit budget remainder and the determined adjusted current frame bit budget remainder.

* * * * *